March 4, 1969   G. CARON   3,431,018
CONVERTIBLE SEATS FOR AUTOMOTIVE VEHICLES
Filed May 29, 1967

# United States Patent Office 3,431,018
Patented Mar. 4, 1969

3,431,018
CONVERTIBLE SEATS FOR AUTOMOTIVE VEHICLES
Georges Caron, Billancourt, France, assignor to Regie Nationale des Usines Renault, Billancourt, Hauts-de-Seine, France
Filed May 29, 1967, Ser. No. 641,779
Claims priority, application France, July 15, 1966, 69,502
U.S. Cl. 297—66                 3 Claims
Int. Cl. B60n 1/10; A47c 13/00

ABSTRACT OF THE DISCLOSURE

Convertible seat for automotive vehicles which comprises displaceable bench and backrest elements, characterised in that said backrest is mounted by means of double hinge means on the one hand about a cylindrical tubular member and on the other hand about a pair of cylindrical coaxial members carried each by a lever rigid with said tubular member and disposed respectively adjacent one and the other end thereof, the axes of said hinge means being parallel to the longer sides of said backrest

---

This invention relates to convertible seats for automotive vehicles and more particularly to a rear seat comprising a bench seat and adapted to be set in different positions.

The seat constituting the subject-matter of the present invention is of the type comprising a bench and a back hingedly mounted on adequate elements of the body structure so that they can be set in different positions by simply tilting or reclining the seat elements.

In fact, it is known that a vehicle may be used for several transport purposes; thus, as it is contemplated to carry passengers with their luggage, or the luggage alone, or cumbersome objects, the vehicle must be capable to meet these various transport requirements by successively modifying the position or setting of the seats, the flexibility of operation of the vehicle being facilitated more particularly by the convertibility of the rear seats.

The hinged mounting of a convertible benchtype seat is not attended by major difficulties and in fact simple links connecting the bench seat to the floor are sufficient to provide the mobility necessary for changing the seat position.

On the other hand the hinged mounting of the backrest is a rather delicate problem for while having due consideration for the various positions which it can occupy, it is necessary to avoid any interference with the shape and structure of the upholstery on which depend the passengers' comfort and the efficiency and useful life of the backrest.

It is the object of the present invention to meet these contradictory requirements within the relatively reduced space available in most automotive vehicles by using two pivot pins properly located along the longitudinal direction of the back while increasing but very moderately the over-all dimensions in relation to the back alone.

The inventive convertible seat for an automotive vehicle, which comprises movable bench and back frame structures, is characterised in that said back is mounted on a double pivot pin formed by a cylindrical tube mounted in bearings to extend along the rear of the back frame adjacent the upper edge thereof, at least two levers rigid with and perpendicular to the tube with a cylindrical socket means on the free end of each lever, and a bearing fixed on the vehicle body structure to receive and removably secure the socket means therein.

The objects, features and advantages of this invention will appear more clearly as the following description proceeds with reference to the accompanying drawing, in which.

Figure 1:
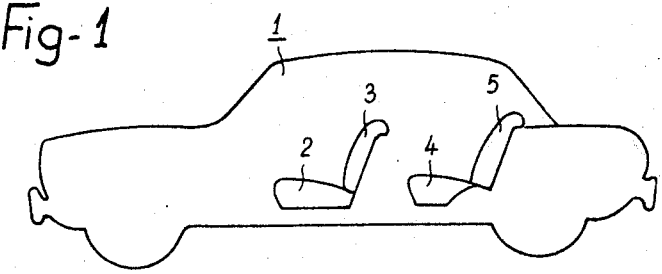
FIGURE 1 illustrates the rear seat in its rearmost setting.

The vehicle 1 illustrated in the drawing comprises two seats: a front seat of the bench type comprising a bench or cushion 2 and a back 3, and a rear seat comprising a bench or cushion 4 and a back 5, both seats being arranged with a view to provide maximum leg room for the rear passengers.

Figure 2:
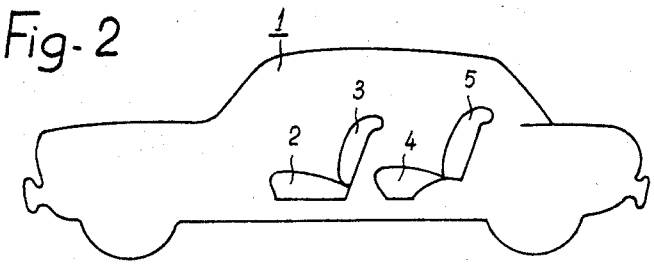
FIGURE 2 shows the same seat in a somewhat advanced setting.

In FIGURE 2 the bench 4 and back 5 are shown in a forward position to facilitate the transport of passengers with their luggage.

Figure 3:
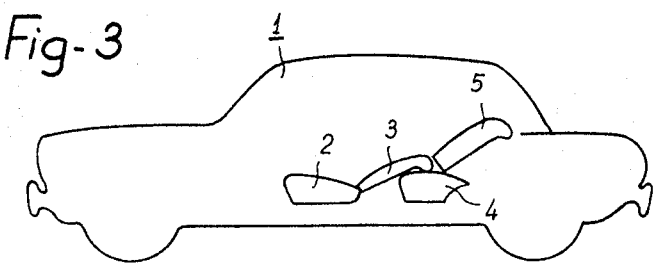
FIGURE 3 shows the rear seat with its back advanced and reclined, in combination with the reclined back of the front seat.

When stopping (FIGURE 3) a relax assembly is obtained by fully reclining the backrest 3 of the front seat upon the rear seat 4 in combination with the rear backrest 5 to which the desired inclination may be given by advancing its lower portion as shown.

Finally, the rear bench or cushion 4 is tilted forward (FIGURE 4) and the rear backrest 5 is raised to a substantially horiozntal position and held in this position by means of straps (not shown), the space thus obtained being most useful for transporting cumbersome objects or articles.

The manner in which these various positions backrest 5 are obtained by means of a double pivot-pin mounting according to the present invention will now be explained with reference to FIGURE 5. This hinged mounting is shown diagrammatically in different types of lines for each one of the four positions illustrated in FIGURES 1 to 4. To facilitate the understanding FIGURE 6 illustrates more in detail the hinged mounting with the back in a position corresponding substantially to the one shown in FIGURE 2. A circular-sectioned cylindrical bar 6 extending substantially throughout the length of the back, adjacent to the top edge thereof is trunnioned in bearings 7 secured ot the metal frame 8 of the backrest by means of screws and nuts 9. The upholstery 10 of the backrest is secured to this frame 8 in a known manner.

This bar 6 has rigidly secured thereto, for example by welding and adjacent each end, a lever 11 carrying a cylindrical socket 12 parallel to said bar and incorporated in the other pivot-pin device.

Figure 4:
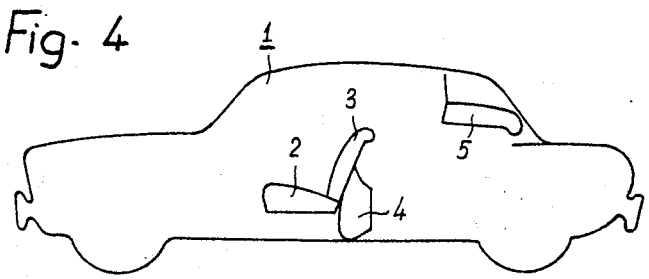
FIGURE 4 illustrates the rear seat with the back raised to the horizontal and the bench tilted forwards.
Figure 5:
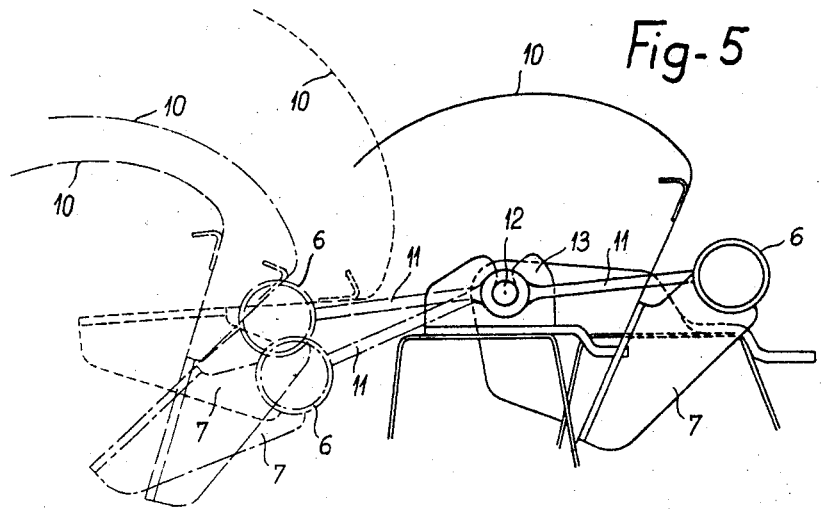
FIGURE 5 illustrates in diagrammatic section and on a larger scale details of the four preceding positions of the rear seat back and of the corresponding positions of the pivot pins thereof.
Figure 6:
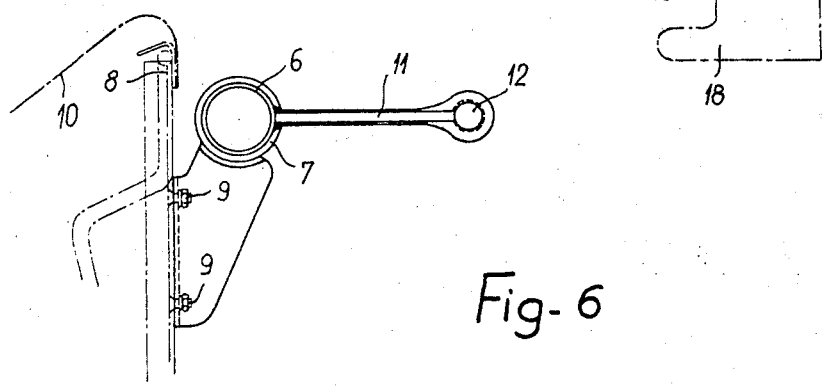
FIGURE 6 is a sectional view showing the hinged mounting of the seat back, the section being taken along a plane at right angles to the pivot axes.

Reverting now to FIGURE 5, it will be seen that the essential component elements of the hinged back are shown in the positions corresponding to FIGURES 1, 2, 3 and 4, respectively in thick lines, in long-dash lines, in dot-and-dash lines and in short-dash lines, namely the bar 6, lever 11, bearing 7 and upholstery 10. More particularly, it will be seen that the bar 6 remains in the same relative position for the back positions shown in FIGURES 3 and 4; the movement from one to the other positions resulting only from a rotation of said bearing 7 about the bar 6.

The bar 6 in combination with the cylindrical sockets 12 co-acting with the various bearings 7 and 13 constitutes a hinged mounting of the linkage type moving in strict synchronism, thereby facilitating the handling of the back by the user.

It is also advantageous to remove the back 5 to win more space with respect to the space available with the arrangement shown in FIGURE 4. One of the cylindrical sockets 12 is so designed that it can easily be removed from one of the bearings 13 which is apertured or notched to this end.

Figure 7:
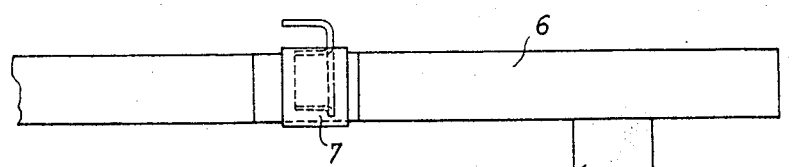
FIGURE 7 is a plan view from above showing the hinge system in a position corresponding substantially to the position shown in FIGURE 2.
Figure 7:

One of the cylindrical sockets 12 (FIGURE 7) is urged by a spring 14 housed therein, and is adapted to slide in a bore 15 formed in lever 11 when the socket is pressed inwards by means of a button 16. In the vicinity of this button 16 the cylindrical socket 12 has formed therein a narrow or neck portion 17 whereby the socket 12 can be released from the bearing 13. The narrow portion 17 is caused to register with the apertured or notched bearing 13 by simply depressing the button 16, so as to release the socket 12 therefrom.

The backrest 5 is then fully released by pulling same obliquely and disengaging the cylindrical socket 12 from the corresponding opposite closed bearing 13.

Each bearing 13 is rigid with a member 18 of the body structure.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims. Thus, both the way of assembling the parts with each other and the shape of these parts may be modified as a function of the specific applications contemplated and to take due account of the specific types of upholstery used in the seat construction.

I claim:
1. A convertible seat for automotive vehicles which comprise displaceable bench and backrest elements, said backrest element comprising a frame upon which the backrest upholstery is secured, at least two spaced first bearings coaxially mounted on an upper rear portion of said backrest element, a tubular member mounted in said first bearings and extending substantially the length of said backrest parallel to and spaced from the upper edge thereof, a pair of spaced, coaxial second bearings fixedly mounted on the vehicle body structure and a pair of levers, one end of each said lever being rigid with said tubular member and the other end of each said lever being secured in said second bearings thereby providing a double hinge mounting for said backrest element.

2. A convertible seat according to claim 1 further comprising cylindrical socket means on the other end of each said lever for securing said lever in said second bearings, said socket means having a reduced diameter along a portion of its length and being movable in its axial direction, each said second bearing having a notch formed therein whereby selective positioning of said reduced diameter portion within said notch permits disengagement of said socket means from the associated second bearing.

3. A convertible seat according to claim 2 further comprising spring means biasing said socket means towards a position in which the greater diameter portion engages the associated second bearing and means adjacent said reduced diameter portion for moving said latter portion into register with said notch.

References Cited

UNITED STATES PATENTS

| | | | |
|---|---|---|---|
| 489,569 | 1/1893 | Ruch | 297—383 |
| 1,332,957 | 3/1920 | Schramm | 297—383 |
| 2,212,682 | 8/1940 | Epifano | 297—64 |
| 2,718,256 | 9/1955 | Carte | 297—66 X |

FOREIGN PATENTS

| | | |
|---|---|---|
| 23,909 | 8/1935 | Australia. |
| 1,138,038 | 1/1957 | France. |

OTHER REFERENCES

German printed application, 1,041,665, January 1955.

JAMES T. McCALL, *Primary Examiner.*

U.S. Cl. X.R.

296—65; 297—118